(12) United States Patent
Haines

(10) Patent No.: US 10,667,609 B2
(45) Date of Patent: Jun. 2, 2020

(54) GARAGE DOOR STORAGE SYSTEM

(71) Applicant: Joseph Haines, Thessalon (CA)

(72) Inventor: Joseph Haines, Thessalon (CA)

( * ) Notice: Subject to any disclaimer, the term of this patent is extended or adjusted under 35 U.S.C. 154(b) by 2 days.

(21) Appl. No.: 15/372,232

(22) Filed: Dec. 7, 2016

(65) Prior Publication Data

US 2018/0153305 A1    Jun. 7, 2018

(51) Int. Cl.
| | |
|---|---|
| *E06B 7/34* | (2006.01) |
| *A47B 95/00* | (2006.01) |
| *E06B 7/28* | (2006.01) |
| *F16M 13/02* | (2006.01) |
| *B65D 25/22* | (2006.01) |

(52) U.S. Cl.
CPC .............. *A47B 95/00* (2013.01); *B65D 25/22* (2013.01); *E06B 7/28* (2013.01); *E06B 7/34* (2013.01); *F16M 13/02* (2013.01)

(58) Field of Classification Search
USPC ......... 220/481; 211/71.01, 85.17; 248/213.1, 248/213.2, 231.91; 160/127
See application file for complete search history.

(56) References Cited

U.S. PATENT DOCUMENTS

| | | | |
|---|---|---|---|
| 2006/0049124 A1* | 3/2006 | Wang ................... | A47B 43/003 211/113 |
| 2016/0201844 A1* | 7/2016 | Potter ...................... | A47F 5/01 248/205.1 |

* cited by examiner

*Primary Examiner* — Andrew T Kirsch
*Assistant Examiner* — Don M Anderson

(57) ABSTRACT

A garage door storage system which can be mounted on an interior surface of garage doors for securely storing various items or storage bins. A base bracket is connected to the interior of the garage door, and a mounting hanger is attached thereto for receiving and securing items or the storage bins thereon, even as the garage door transits between an up or down position.

12 Claims, 6 Drawing Sheets

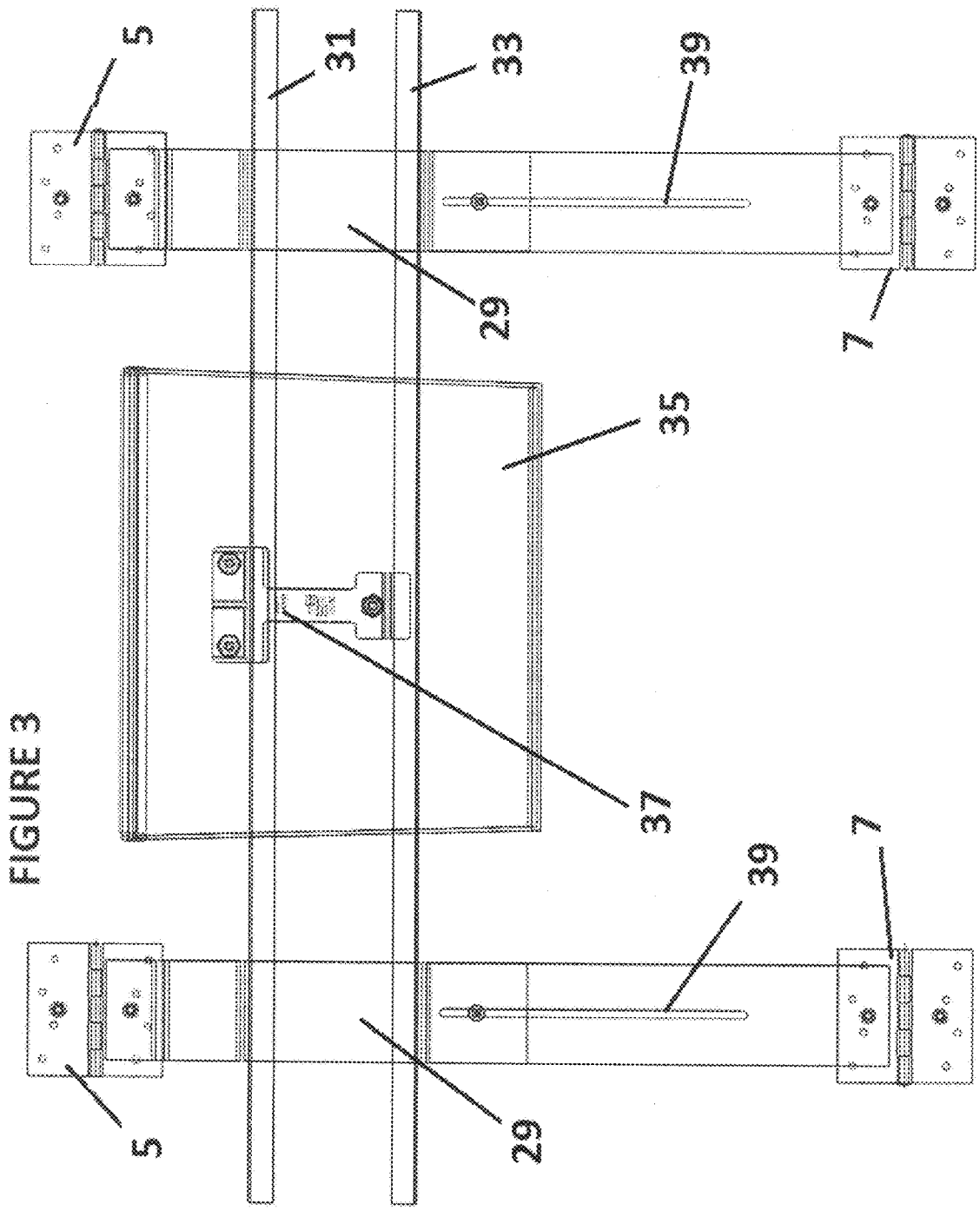

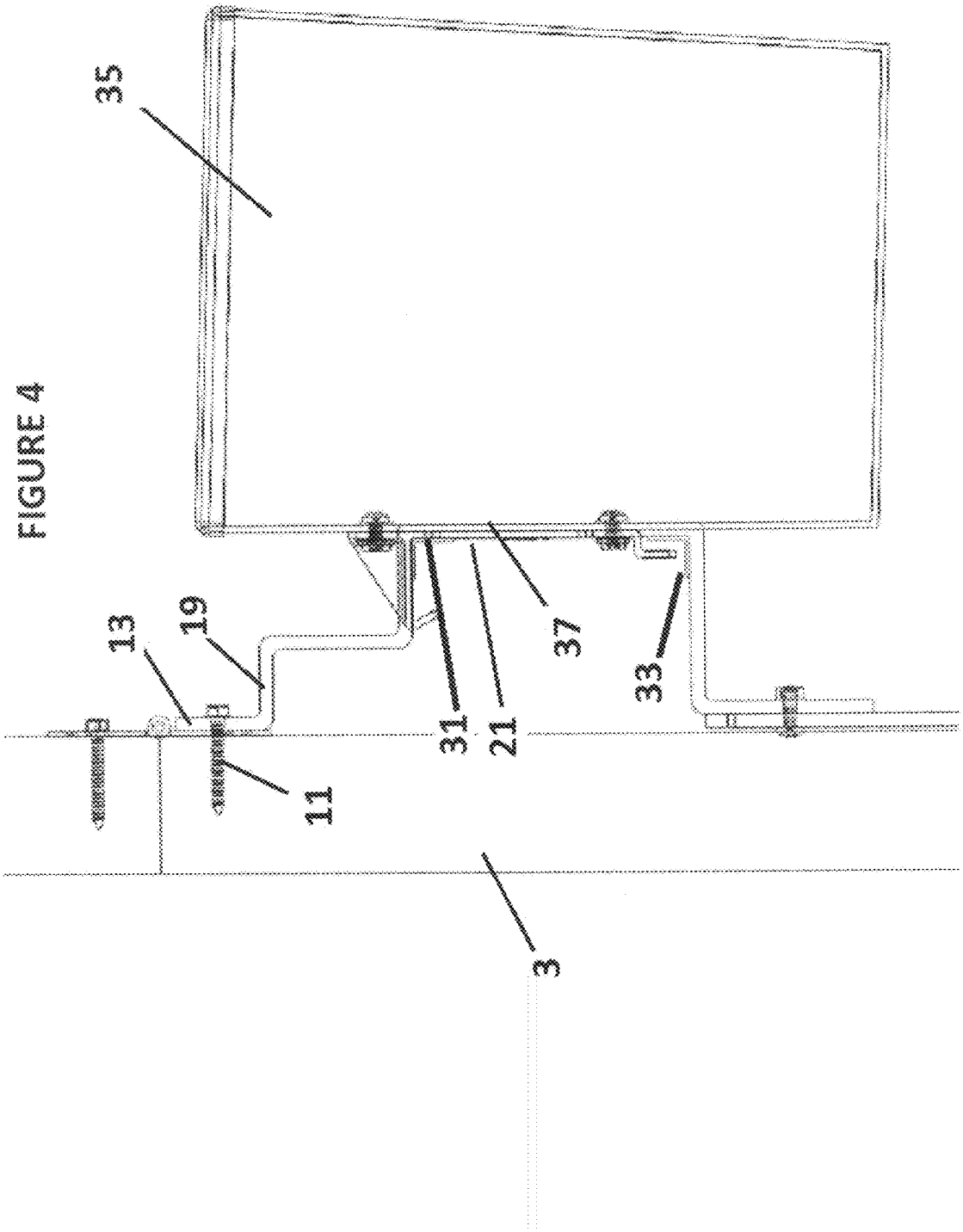

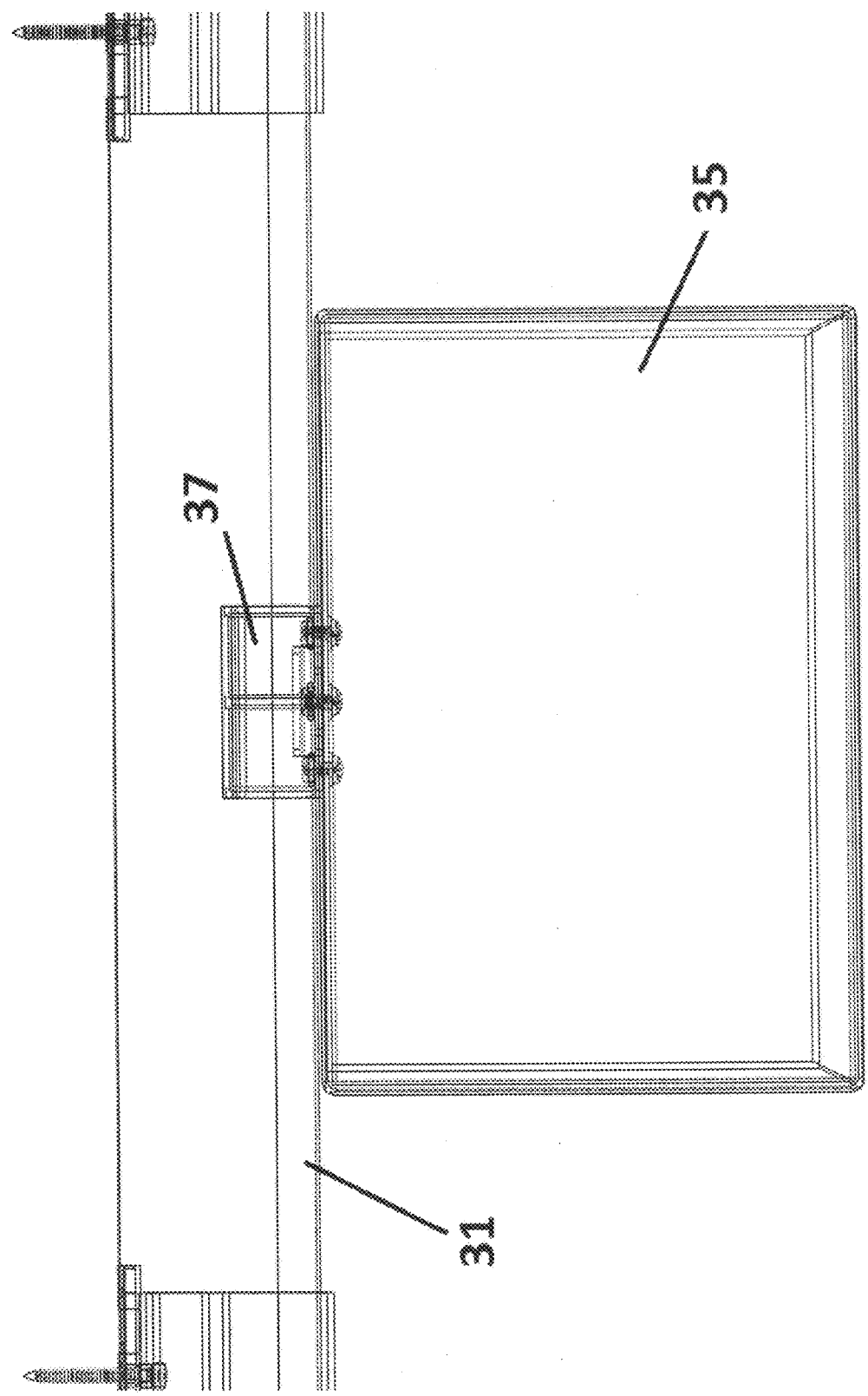

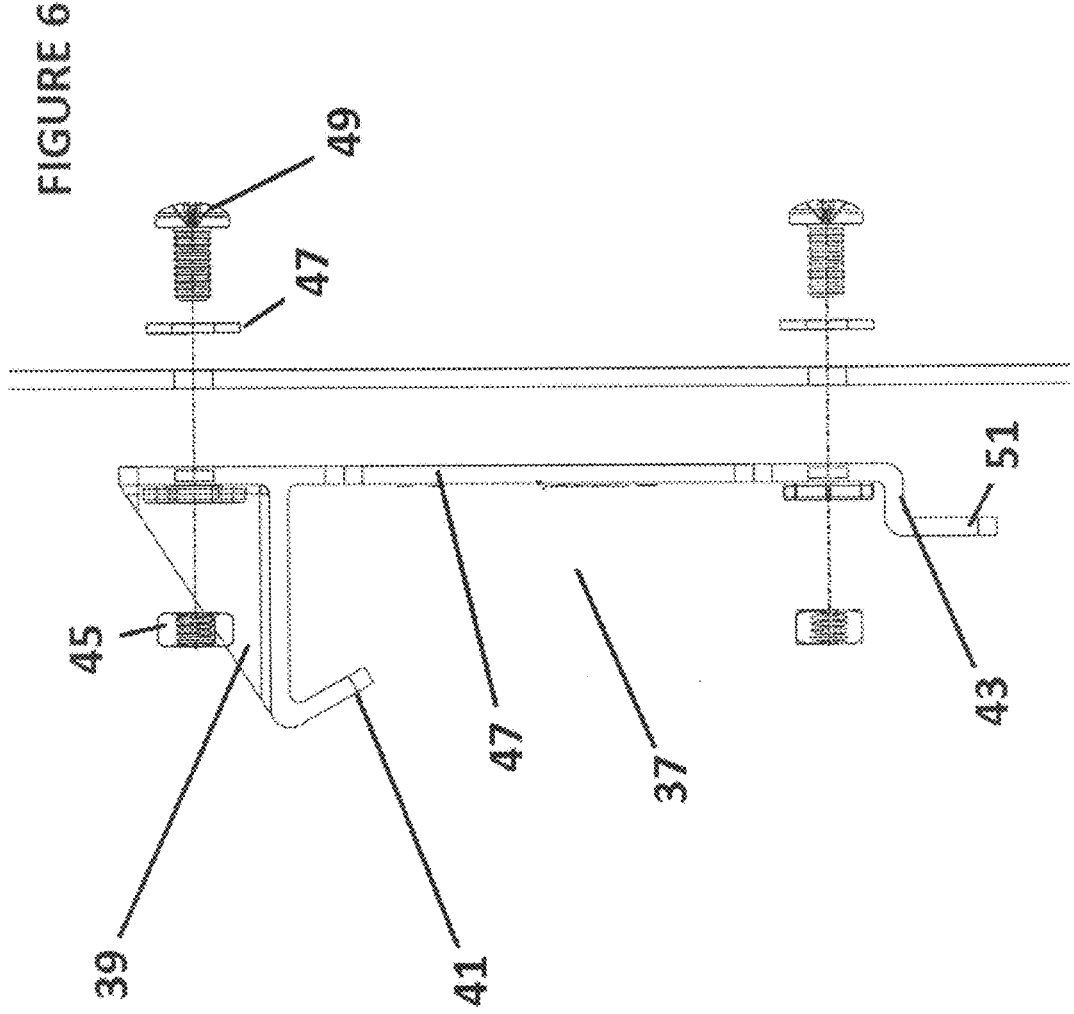

GARAGE DOOR STORAGE SYSTEM

The present invention relates to a garage door storage system, and, more particularly, to an improved garage door storage system which can be mounted on an interior surface of garage doors, whether they be residential or commercial, and which can securely store various items or accommodate a wide variety of user selected storage bins.

BACKGROUND OF THE INVENTION

It is well known that space within garages can be limited as, in addition to motor vehicles, homeowners also utilize garage space for storing a wide variety of indoor and outdoor items, and it is typical that many garage spaces can be cluttered with such items. Garage doors commonly represent more than 20% of wall space in a garage, and this potential extra storage space is presently in general underutilized, as this space is typically not available for common storage. Several storage solutions have been contemplated, such as United States Patent Publication No. US2012/0234505 (Hartwig et al). However, Hartwig et al is designed with the intention of storing elongated items, such as fishing poles, on the interior of a garage door, utilizing straps having adjustable loops to secure the items. As such, Hartwig et al is not suited or designed for storing smaller, non-elongated items. Another such storage system, namely United States Patent Publication No. US2016/0201844 (Potter), is designed with the concept of storing ladders on the interior of a garage door, however the device disclosed in Potter is also not suited or designed for storing smaller, non-elongated items.

It would therefore be advantageous to have an improved garage door storage system which is easy to install, using existing hardware native to the garage door, which does not impede use and operation of the garage door, and which does not require any modification to the garage door.

It would also be advantageous to have an improved garage door storage system which can easily and securely store items or storage containers on the interior of the garage door, even as the door transits between an up or down position. To this end, the present invention effectively addresses these needs.

SUMMARY OF THE INVENTION

The present invention provides the advantage of an improved garage door storage system which is easy to install utilizing existing hardware that is native to the garage door, which does not impede use of the garage door, and which does not require any modification to the garage door.

The present invention also provides the advantage of an improved garage door storage system which can easily and securely store items or storage containers on the interior of the garage door, even as the door transits between an up or down position.

According to a first broad aspect of an embodiment of the present invention, there is disclosed a garage door storage system comprising at least one base bracket constructed and arranged to be connected to an interior surface of the garage door; and at least one mounting hanger constructed and arranged for attachment to the at least one base bracket, the at least one mounting hanger being adapted to receive and secure storage items thereon.

According to another broad aspect of an embodiment of the present invention, there is disclosed a garage door storage system comprising at least one base bracket constructed and arranged to be connected to an interior surface of the garage door; at least one mounting hanger constructed and arranged for attachment to the at least one base bracket, the at least one mounting hanger being adapted to receive and secure storage items thereon; and at least one storage bin constructed and arranged to be attached to the at least one mounting hanger.

According to another aspect of the present invention, there is provided a garage door storage system comprising at least one base bracket constructed and arranged to be connected to an interior surface of the garage door, the at least one base bracket further comprising a securement bracket having a lower end constructed and arranged to be secured to a garage door hinge, and an upper end constructed and arranged to be secured to the interior of the garage door; and a receiving bracket connected to the securement bracket; at least one mounting hanger constructed and arranged for attachment to the at least one base bracket, the at least one mounting hanger being adapted to receive and secure storage items thereon and further comprising a middle portion; an upper end integrally connected to the middle portion, and having an outermost lip portion bent inwardly towards the middle portion; a lower end having a shoulder portion; and at least one storage bin constructed and arranged to be attached to the at least one mounting hanger.

According to another aspect of the present invention, there is provided a kit for providing a garage door storage system comprising at least one base bracket constructed and arranged to be connected to an interior surface of the garage door; and at least one mounting hanger constructed and arranged for attachment to the at least one base bracket, the at least one mounting hanger being adapted to receive and secure storage items thereon.

BRIEF DESCRIPTION OF THE DRAWINGS

The embodiments of the present invention will now be described by reference to the following figures, in which identical reference numerals in different figures indicate identical elements and in which:

FIG. 3 is a front view of the garage door storage system of the present invention, illustrating a storage bin suspended from the horizontal bars, the bin being shown in a transparent view;

FIG. 4 is a side view of the storage bin of the present invention shown in FIG. 3;

FIG. 5 is a top view of the storage bin of the present invention shown in FIG. 3; and FIG. 6 is a side view of the connection of the mounting hanger to the receiving bracket.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Figure 1:
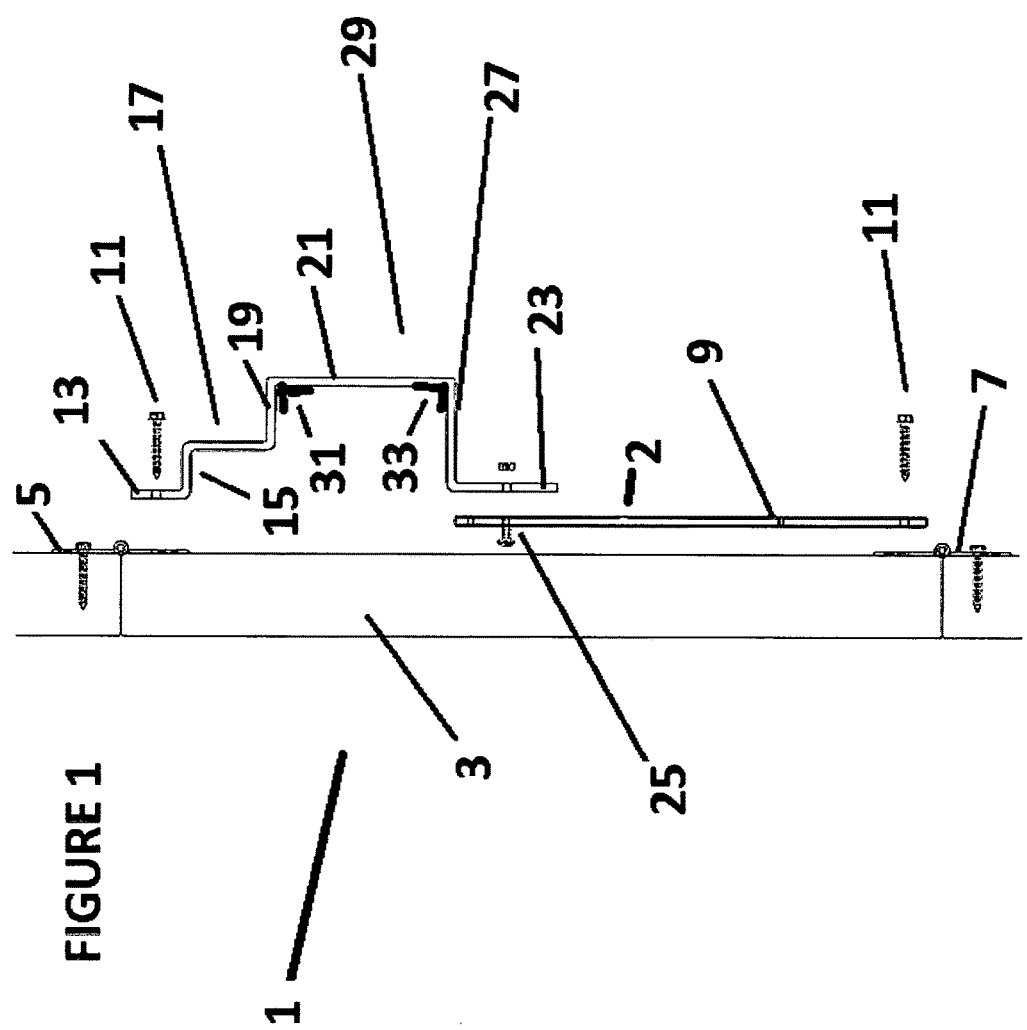
FIG. 1 is a side view of the garage door storage system of the present invention, illustrating the base bracket components, specifically the securement bracket and the receiving bracket.

The present invention consists of an improved garage door storage system. Referring to FIG. 1, there is shown components of the garage door storage system, shown generally at 1 in accordance with a first exemplary embodiment of the present invention.

In this embodiment, as hereinafter described, a base bracket 2 is connected to an interior surface of the garage door 3. This base bracket 2 comprises two separate components, which are a securement bracket 9 and a receiving bracket 29 connected to the securement bracket 9 by, for example, a screw 25, as shown in FIG. 1. The securement bracket 9 has a lower end adapted to be secured to a garage door hinge 7 by securing means 11, such as screws, and an upper end also adapted to be secured to the interior of the garage door 3 or an upper garage door hinge 5 by securing means 11. Of course it will be understood that more than one base bracket 2 can be attached to the interior surface of the garage door 3, preferably in a spaced apart relationship. It will also be understood that the securement bracket 9 and the receiving bracket 29 attach to the garage door utilizing hardware that is native to the door. In essence, a machine screw that holds the door panel hinge to the door is first removed, the securement bracket 9 and the receiving bracket 29 are then positioned over the screw hole and these are then secured to the garage door by reinserting the screw into the screw hole.

As also shown in FIG. 1, the receiving bracket 29 possesses, in an exemplary embodiment, a first base portion 15 integrally connected at substantially a 90 degree angle to an upper portion 13 of the receiving bracket 29. The receiving bracket also possesses a first vertical portion 17, a second base portion 19, a mounting wall portion 21 (each of these being integrally connected at substantially a 90 degree angle to one another) and a third base portion 27, which is also integrally connected at substantially a 90 degree angle to each of the mounting wall portion 21 and the lower portion 23 of the receiving bracket 29.

Figure 2:
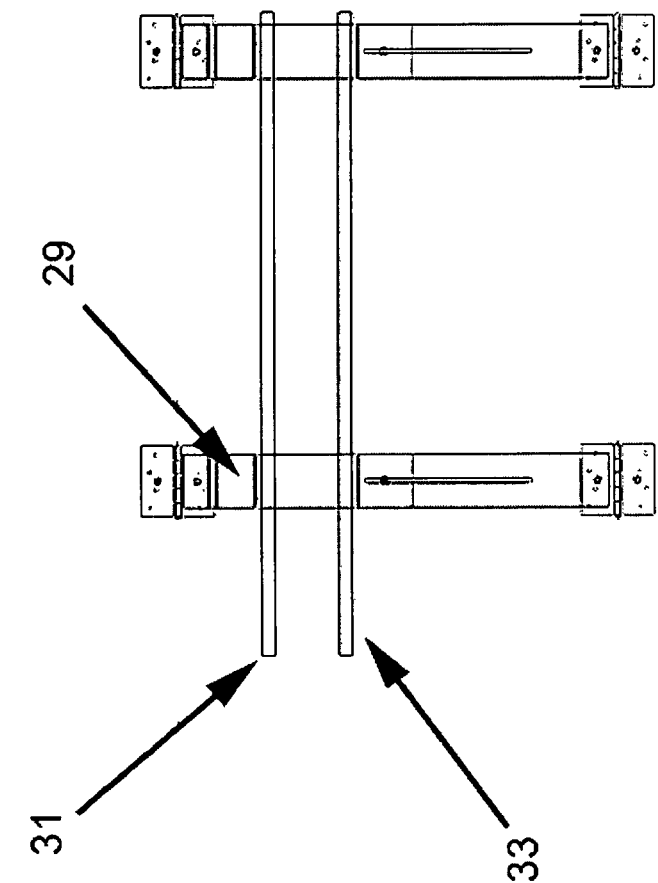
FIG. 2 is a front view of the garage door storage system of the present invention, illustrating the base bracket components attached to the garage door, and the horizontal bars for storing items therefrom.

As shown in FIG. 2, the receiving bracket 29 is designed to receive thereon at least a first horizontal bar 31 and a second horizontal bar 33, which are spaced apart in a substantially parallel relationship, the bars extending between opposed receiving brackets 29 secured to the interior of the garage door, though of course variations to this are possible. Of course, it will be understood that the horizontal bars are connected to the receiving brackets 29, by securing means such as screws. A mounting hanger 37 (as will hereinafter be described), shown in FIG. 3, can be secured between a storage bin 35, for example, and the mounting wall portion 21 of receiving bracket 29 (as shown in FIG. 4) by means such as screws, so that the mounting hanger 37 is thus positioned to engage and reside upon each of the horizontal bars 31, 33, as shown in FIGS. 3 and 4 enabling the storage of items and/or storage bins 35. It will also be understood that the size and of the angle (height and width) of horizontal bars 31, 33, as well as the thickness and length thereof can be varied. FIG. 5 illustrates a top view of the storage bin shown in FIG. 3.

With reference to FIG. 6, there is shown the mounting hanger 37 of the present invention, mounted to mounting wall portion 21 of the receiving bracket 29 by means such as screws 49, utilizing also a washer 47 and nut 45. This mounting hanger 37 has a middle portion 47, and an upper end 39 integrally connected to the middle portion 47. The upper end 39 possesses an outermost lip portion 41 that is bent inwardly towards the middle portion 47, and a lower end 51 having a shoulder portion 43 connected therewith. In this manner, the mounting hanger 37, when positioned to engage and reside upon each of the horizontal bars 31, 33, as shown in FIG. 3, thus has outermost lip portion 41 enclosing horizontal bar 31, while shoulder portion 43 rests upon horizontal bar 33. As a result, when the garage door 3 is moved from a closed position to an open position (ie: when the door transits from a down position to an up position), the storage bins 35 attached to the horizontal bars 31,33 maintain the bins 35 in a substantially parallel relationship with the garage door 3 in the "up" position, by virtue of the outermost lip portion 41 enclosing horizontal bar 31, and shoulder portion 43 resting upon horizontal bar 33, both of which prevent the bins 35 from swinging downwardly from the door 3 when the door is moved to the "up" position. In an exemplary embodiment, the mounting hanger can be formed from extruded material, or fashioned from metal, or other types of materials, as would be understood by one skilled in the art.

In another exemplary embodiment of the present invention, and as shown in FIG. 3, the receiving bracket 29 also possesses adjustments slots 39 thereon, which allow for the garage door storage system to be adjusted vertically on a garage door.

In another exemplary embodiment of the present invention, the mounting hanger can also be used to, in lieu of using a storage bin, storing items such as a Paper Towel Holder, a Liquid container bracket (windshield washer fluid etc.), a Key Holder compartment, or a fishing Pole/Tool storage kit, amongst many other possible options, as would be readily apparent to one skilled in the art.

It will be apparent to those skilled in this art that various modifications and variations may be made to the embodiments disclosed herein. Other embodiments consistent with the present invention will become apparent from consideration of the specification and the practice of the invention disclosed therein.

Accordingly, the specification and the embodiments are to be considered exemplary only, with a true scope of the invention being disclosed by the following claims.

I claim:

1. A garage door storage system comprising:
   at least one base bracket constructed and arranged to be connected to an interior surface of the garage door and having a securement bracket with a lower end constructed and arranged to be secured to a garage door hinge, and an upper end constructed and arranged to be secured to the interior surface of the garage door;
   a receiving bracket connected to the securement bracket, wherein the receiving bracket further comprises at least a first horizontal bar and a second horizontal bar constructed and arranged for attachment to the receiving bracket, the first horizontal bar and the second horizontal bar being spaced apart in a substantially parallel relationship; and
   at least one mounting hanger constructed and arranged for attachment to the at least one base bracket, the at least one mounting hanger being adapted to receive and secure storage items thereon and to engage with and reside upon each of the first horizontal bar and the second horizontal bar.

2. The garage door storage system of claim 1, wherein the at least one base bracket is mounted to the interior surface of the garage door by securing means.

3. The garage door storage system of claim 1, wherein the system further comprises at least one storage bin constructed and arranged to be attached to the at least one mounting hanger.

4. The garage door storage system of claim 1, wherein the at least one mounting hanger further comprises:
   a middle portion;
   an upper end integrally connected to the middle portion, and having an outermost lip portion bent inwardly towards the middle portion; and
   a lower end having a shoulder portion.

5. The garage door storage system of claim 1, wherein the receiving bracket further comprises an upper portion constructed and arranged to be secured to the garage door hinge, and a lower portion adapted for connection to the upper end of the securement bracket.

6. The garage door storage system of claim 5, wherein the receiving bracket further comprises:
   a first base portion integrally connected at substantially a 90 degree angle to the upper portion of the receiving bracket;
   a first vertical portion integrally connected at substantially a 90 degree angle to the first base portion;
   a second base portion integrally connected at substantially a 90 degree angle to the first vertical portion;
   a mounting wall portion integrally connected at substantially a 90 degree angle to the second base portion;
   a third base portion integrally connected at substantially a 90 degree angle to each of the mounting wall portion and the lower portion of the receiving bracket.

7. A garage door storage system comprising:
   at least one base bracket constructed and arranged to be connected to an interior surface of the garage door, and having a securement bracket with a lower end constructed and arranged to be secured to a garage door hinge, and an upper end constructed and arranged to be secured to the interior surface of the garage door; and
   a receiving bracket connected to the securement bracket, wherein the receiving bracket further comprises at least a first horizontal bar and a second horizontal bar constructed and arranged for attachment to the receiving bracket, the first horizontal bar and the second horizontal bar being spaced apart in a substantially parallel relationship;
   at least one mounting hanger constructed and arranged for attachment to the at least one base bracket, the at least one mounting hanger being adapted to receive and secure storage items thereon and to engage with and reside upon each of the first horizontal bar and the second horizontal bar; and
   at least one storage bin constructed and arranged to be attached to the at least one mounting hanger.

8. The garage door storage system of claim 7, wherein the at least one mounting hanger further comprises:
   a middle portion;
   an upper end integrally connected to the middle portion, and having an outermost lip portion bent inwardly towards the middle portion; and
   a lower end having a shoulder portion.

9. The garage door storage system of claim 7, wherein the receiving bracket further comprises an upper portion constructed and arranged to be secured to the garage door hinge, and a lower portion adapted for connection to the upper end of the securement bracket.

10. The garage door storage system of claim 9, wherein the receiving bracket further comprises:
    a first base portion integrally connected at substantially a 90 degree angle to the upper portion of the receiving bracket;
    a first vertical portion integrally connected at substantially a 90 degree angle to the first base portion;
    a second base portion integrally connected at substantially a 90 degree angle to the first vertical portion;
    a mounting wall portion integrally connected at substantially a 90 degree angle to the second base portion;
    a third base portion integrally connected at substantially a 90 degree angle to each of the mounting wall portion and the lower portion of the receiving bracket.

11. A kit for providing a garage door storage system comprising:
    at least one base bracket constructed and arranged to be connected to an interior surface of the garage door, and having a securement bracket with a lower end constructed and arranged to be secured to a garage door hinge, and an upper end constructed and arranged to be secured to the interior surface of the garage door;
    a receiving bracket connected to the securement bracket, wherein the receiving bracket further comprises at least a first horizontal bar and a second horizontal bar constructed and arranged for attachment to the receiving bracket, the first horizontal bar and the second horizontal bar being spaced apart in a substantially parallel relationship; and
    at least one mounting hanger constructed and arranged for attachment to the at least one base bracket, the at least one mounting hanger being adapted to receive and secure storage items thereon, and to engage with and reside upon each of the first horizontal bar and the second horizontal bar.

12. The kit of claim 11, wherein the kit further comprises at least one storage bin constructed and arranged to be attached to the at least one mounting hanger.

* * * * *